June 8, 1926.

J. CARRIE

PLATE GLASS HOLDER

Filed Sept. 12, 1924

1,588,012

Inventor
James Carrie
By
Attorneys

Witness
M. Kweso
R. E. Weber

Patented June 8, 1926.

1,588,012

UNITED STATES PATENT OFFICE.

JAMES CARRIE, OF BUTLER, PENNSYLVANIA, ASSIGNOR OF ONE-THIRD TO CHARLES GRICE, OF PASSAIC, NEW JERSEY, AND ONE-THIRD TO WILLIAM D. SAWYER, OF MILWAUKEE, WISCONSIN.

PLATE-GLASS HOLDER.

Application filed September 12, 1924. Serial No. 737,440.

This invention relates to plate glass holders and is particularly directed to automatic plate glass holders. In plate glass holders, as heretofore constructed, in which a plate or slab of glass was placed on the holding table, difficulty was experienced due to the fact that if the glass cracked adjacent one of the suction cups that all of the suction cups released. Further than this, the application of all of the cups to the glass was not insured and it occasionally happened that all of the cups would not seat upon the glass and consequently the suction was finally released in all of the cups.

This invention is designed to overcome the above noted defects and objects of such invention are to provide a plate glass holder in which the suction in the several cups is independent, and in which, after a release occurs in one of the cups, the suction in the remaining cups is unaltered.

Further objects are to provide a simple and easily operated means for applying and removing the suction cups and to provide a construction which may be very easily and cheaply manufactured and which is simple in operation.

An embodiment of the invention is shown in the accompanying drawing, in which:—

Figure 1:
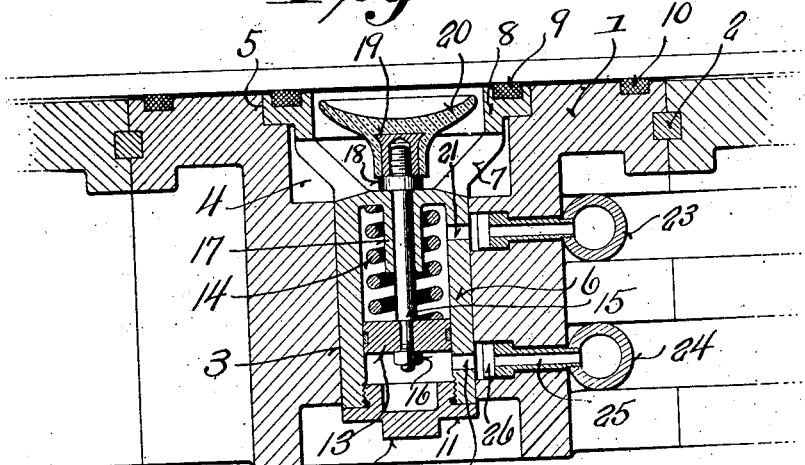
Figure 1 is an enlarged sectional view through one of the cups and the adjacent portion of the table.
Figure 2:
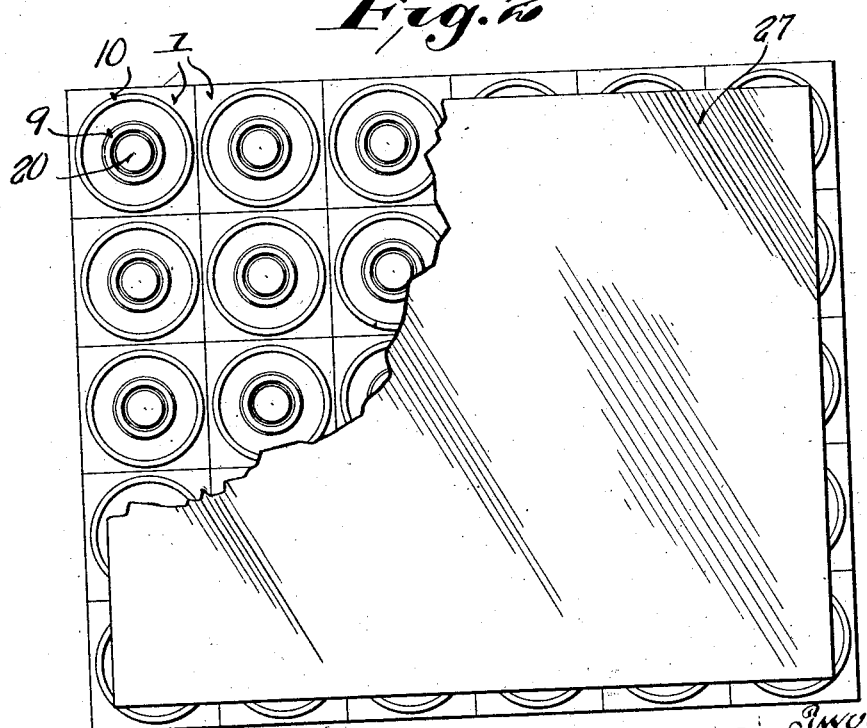
Figure 2 is a plan view of the table drawn to a smaller scale and showing a slab of glass partly broken away, in position.

Referring to the drawing in detail, it will be seen that the table comprises a body portion composed of a series of rectangular units 1 which are locked together by keys 2 so as to attain accurate aligning of the several units forming the table. Each of these units is provided with a cylindrical aperture therethrough as indicated at 3 (see Figure 1) and is further provided with an enlarged aperture 4 adjacent its upper portion. This aperture is provided with a recessed marginal aperture 5, as shown in Figure 1.

The suction apparatus comprises a cylinder 6 which is fitted and secured within the aperture 3. This cylinder is provided with upstanding arms 7 which carry a ring like member 8 provided with an annular channel within which a padding or gasket consisting preferably of a ring of rubber 9 is provided, such padding or ring being concentric with and smaller than a surrounding ring 10 carried by the body portion 1.

The cylinder 6 has its lower end closed by means of a screw cap 11 which is provided with a shaped head 12 adapted to receive a wrench.

A piston 13 provided with suitable packing rings is positioned within the cylinder and is normally urged downwardly by means of a helical spring 14, such spring being preferably relatively stiff. The piston carries a piston rod 15 which has a reduced portion secured by a nut 16 to the piston. This piston rod extends through an elongated sleeve 17 formed integral with the cylinder body 6, such guide or sleeve 17 also aiding in centering the spring 14. The upper end of the piston rod is provided with a shouldered portion 18 which, when the device is completely retracted rests upon the outer end of the cylinder 6. The head of the piston rod is threaded and is screwed into an inset 19 moulded within the vacuum or suction cup 20, such cup being preferably formed of rubber. The cylinder is provided with an upper aperture 21 and a lower aperture 22 which communicate with corresponding apertures in the body portion 1 of the device. A pair of control pipes 23 and 24 are connected with the apertures 21 and 22, respectively, by means of headed fittings 25 which are positioned within the apertures in the body portion 1, and are screwed into the pipes 23 and 24, such fittings being preferably shouldered to fit the correspondingly shaped aperture, and also provided with a slot 26 in their outer ends, so that they may be readily manipulated by a suitable tool.

In operating the device the plate or slab of glass 27 is placed upon the table and compressed air or other pressure fluid supplied the pipes 24. This forces the pistons 13 upwardly and collapses the vacuum cups 20 or suction cups against the under side of the glass slab. Thereafter, the pressure is removed and the spring 14 retracts the pistons thus drawing downwardly on the attached suction cups and securely holding the glass in tight contact with the rings 9 and 10.

After polishing has taken place and it is desired to release the cups, pressure fluid is admitted to the pipes 23 and thus forces the pistons 13 downwardly, thereby withdrawing the cups 20 from engagement with the plate of glass and releasing such plate.

It will be seen that a plate glass holder has been provided in which the suction cups may be readily applied in a simultaneous manner, in which the suction cups may be readily detached, and in which the breaking of the suction or vacuum at one of the cups does not influence the operation of the other cups.

Although the invention has been described in considerable detail, it is to be understood that the invention may be variously embodied and is, therefore, to be limited only as claimed.

I claim:

1. A plate glass holder comprising a body portion, a cylinder carried thereby, a piston fitted within said cylinder, a spring urging said piston downwardly, a rod carried by said piston, a suction cup carried by the upper end of said rod, and means for admitting pressure fluid to opposite sides of said piston.

2. A plate glass holder comprising a stationary support having a plurality of regularly spaced packing rings adapted to support a glass plate, a cylinder mounted below each of said packing rings, a piston carried within said cylinder, a spring urging said piston downwardly, conduits leading to said cylinder and opening on opposite sides of said piston, a piston rod carried by said piston and projecting upwardly through said cylinder, a vacuum cup carried by said piston rod and normally positioned below the lower plane of said glass plate, each of said vacuum cups being free from connection with any other vaccum cup, whereby when suction is broken in one of said cups no effect is produced on any other cup, and whereby said cups may be pneumatically raised and lowered as desired.

In testimony that I claim the foregoing I have hereunto set my hand at Butler, in the county of Butler and State of Pennsylvania.

JAMES CARRIE.